(12) United States Patent
Fritel et al.

(10) Patent No.: US 9,718,307 B2
(45) Date of Patent: Aug. 1, 2017

(54) TIRE HANDLER

(71) Applicant: Fritel & Associates, LLC, Waco, TX (US)

(72) Inventors: Raymond Fritel, Waco, TX (US); Alan Cluke, Waco, TX (US); Graham Musgrove, Waco, TX (US)

(73) Assignee: Fritel & Associates, LLC, Waco, TX (US)

( * ) Notice: Subject to any disclaimer, the term of this patent is extended or adjusted under 35 U.S.C. 154(b) by 0 days.

(21) Appl. No.: 15/059,258

(22) Filed: Mar. 2, 2016

(65) Prior Publication Data

US 2016/0257166 A1  Sep. 8, 2016

Related U.S. Application Data

(60) Provisional application No. 62/126,717, filed on Mar. 2, 2015.

(51) Int. Cl.
| | |
|---|---|
| *B66C 1/00* | (2006.01) |
| *B60B 30/02* | (2006.01) |
| *B60B 30/04* | (2006.01) |
| *B60B 30/06* | (2006.01) |
| *B66C 1/44* | (2006.01) |
| *B60B 29/00* | (2006.01) |
| *B66C 1/24* | (2006.01) |
| *B66C 1/62* | (2006.01) |
| *B66F 9/18* | (2006.01) |

(52) U.S. Cl.
CPC ............ *B60B 30/02* (2013.01); *B60B 29/002* (2013.01); *B60B 30/04* (2013.01); *B60B 30/06* (2013.01); *B66C 1/24* (2013.01); *B66C 1/44* (2013.01); *B66C 1/62* (2013.01); *B66F 9/18* (2013.01)

(58) Field of Classification Search
CPC ............ F16H 1/28; F16H 2057/02078; F16H 57/023; F16H 2057/0062; B66C 1/24; B66C 1/54; B66C 1/44; F03D 11/02; F03D 1/003; F05B 2260/40311; Y10T 29/49718; B23P 17/00; Y02E 10/722; E01D 21/00; C21C 5/441; E04G 23/06; B60B 30/02; B60B 30/04; B60B 30/06; B60B 29/002; B66F 9/18
USPC ........... 294/67.21–67.22, 86.41; 74/318, 413
See application file for complete search history.

(56) References Cited

U.S. PATENT DOCUMENTS

| | | | | |
|---|---|---|---|---|
| 3,427,066 A | * | 2/1969 | Kugler | ...................... B66C 1/62 294/106 |
| 3,998,488 A | * | 12/1976 | Durgan | ...................... B66C 1/24 294/67.21 |
| 4,401,405 A | | 8/1983 | Ealet | |

(Continued)

FOREIGN PATENT DOCUMENTS

| | | |
|---|---|---|
| DE | 3510511 A1 | 9/1985 |
| GB | 2349854 A | 11/2000 |

*Primary Examiner* — Stephen Vu

(74) *Attorney, Agent, or Firm* — George M. Tompkins; Tompkins, P.C.

(57) ABSTRACT

Disclosed herein is a tire handler for the movement and manipulation of tires and wheels for large vehicles. The tire handler is lifted by a crane or similar hoisting equipment. The tire handler comprises improvements including an automatic leveling system, power adjustable tire control and support arms, and wireless remote operation of powered functions.

19 Claims, 13 Drawing Sheets

(56) References Cited

U.S. PATENT DOCUMENTS

| | | | |
|---|---|---|---|
| 4,430,040 A * | 2/1984 | Halmos | B21C 47/242 294/103.2 |
| 4,801,237 A | 1/1989 | Yamamoto | |
| 5,167,065 A | 12/1992 | Koga | |
| 6,733,085 B1 * | 5/2004 | Oberg | B60P 1/045 298/17 S |
| 8,621,697 B2 * | 1/2014 | Bruckner | E01D 22/00 14/77.1 |

* cited by examiner

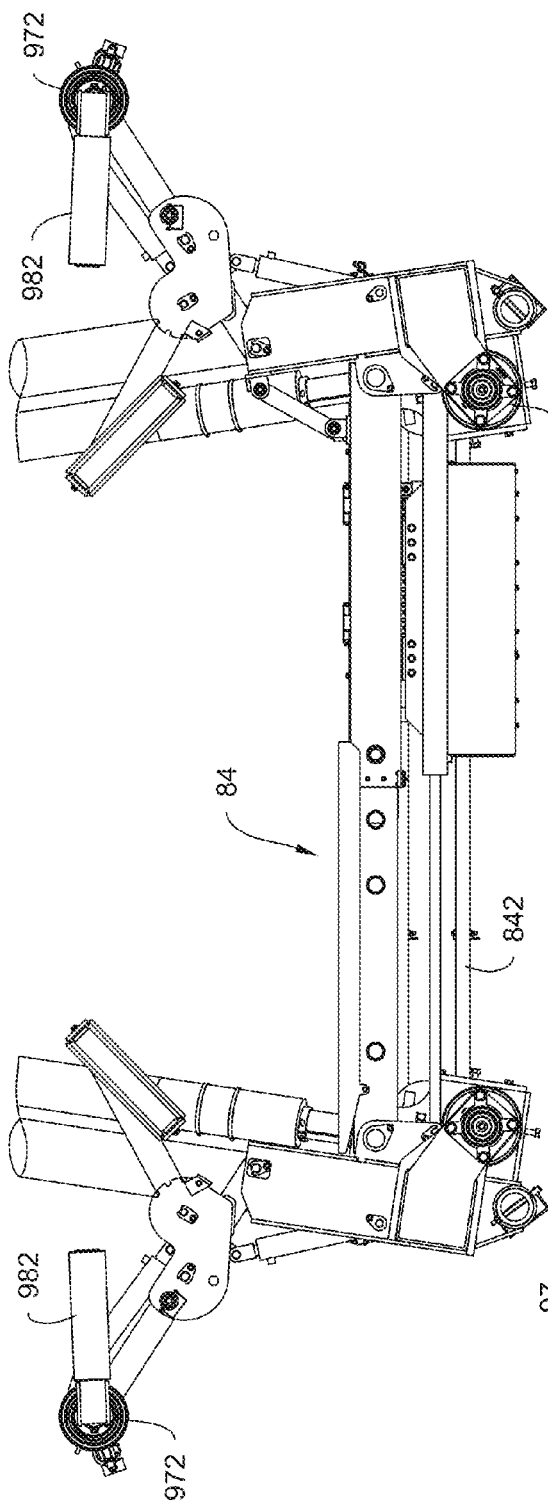
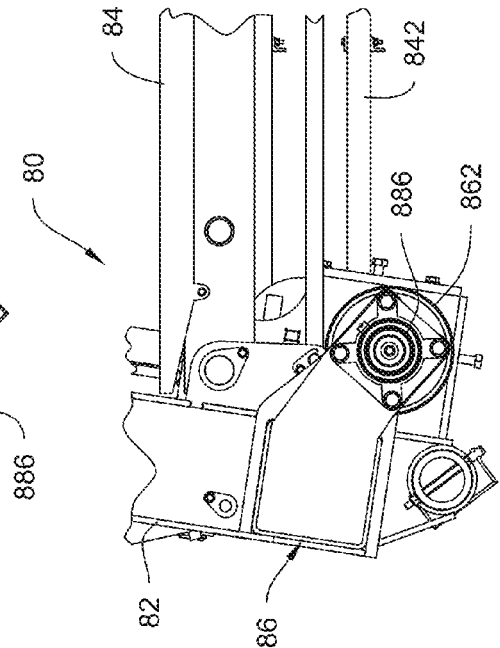
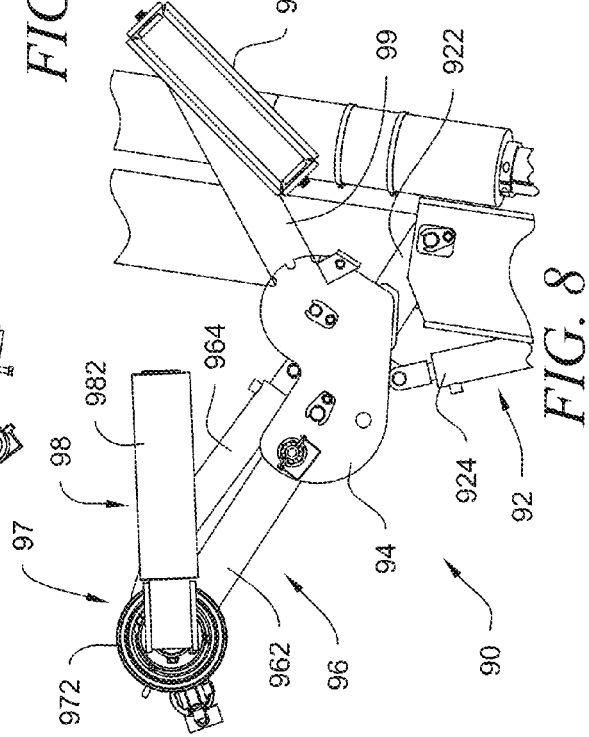
FIG. 7
FIG. 9
FIG. 8

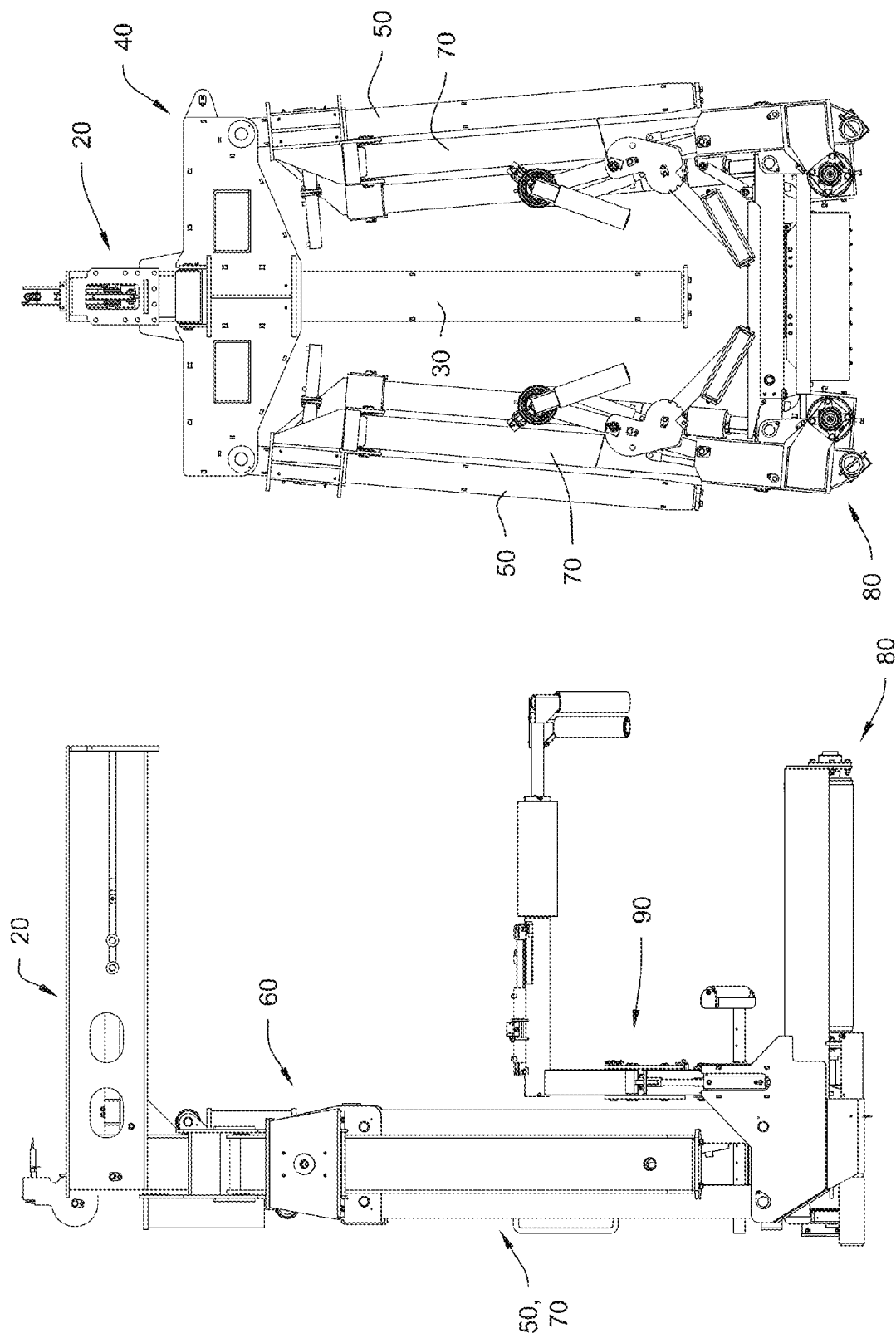

TIRE HANDLER

PRIORITY CLAIMS

This application claims priority to U.S. Provisional Application No. 62/126,717, filed Mar. 2, 2015 which is hereby incorporated by reference as if fully set forth herein.

TECHNICAL FIELD OF THE INVENTION

The present invention is generally directed devices to facilitate transportation, installation, removal, repair, and other handling of tires and wheels for large vehicles.

BACKGROUND ART OF THE INVENTION

It is well know that tires are an important part of most land vehicles. As the point of contact between the vehicle and the driving surface—in many applications, literally where the rubber meets the road—properly maintained tires are important for traction, stability, efficiency, handling, and occupant comfort. Tire maintenance on most passenger vehicles is easily accomplished by lifting the vehicle with a jack and then manually removing and replacing the tire/wheel combination.

Large industrial vehicles, however, are often equipped with tires that have diameters larger than human height and with tire/wheel combinations that weigh several thousand pounds. Such tires cannot be manually manipulated. Further, even with mechanical lifting assistance, it can be difficult and dangerous to maneuver very heavy tires into proper alignment with hubs, lugs, and other connections necessary for mounting on or removal from a vehicle. These difficulties are often exacerbated by a lack of working room around the tire and the need to work on a vehicle in the field rather than at a shop.

Several devices have been used to help with handling of very large tires and wheels. For example, rolling dollies have been used to support the tire and maneuver the tire by moving the dolly. However, these devices typically ride on relatively small wheels, making maneuvering over rough terrain difficult or impossible. Additionally, dolly devices have no or limited vertical leveling ability, making proper alignment of the tire/wheel difficult or impossible. These devices also are typically able to handle a small range of tire sizes.

Other tire handling devices comprise specialized large robotic arms with varying degrees of maneuverability. Robotic arm devices are very heavy and complicated and typically must be mounted to a dedicated heavy truck. As a result, the devices are very expensive and cannot be practically made available at all locations.

What is needed is a tire handling device that is capable of safely moving and manipulating large and heavy tires and wheels for a variety of vehicles. The tire handling device should be able to work with commonly-available hoisting equipment and be easily adjustable to allow safe and convenient servicing of a range of tire sizes.

SUMMARY

The above objectives are met by providing a tire handler for movement and manipulation of tires and wheels for large vehicles comprising some or all of these elements:

a suspension arm with a front end and a rear end;

a hoist attachment hook connected to the suspension arm and selectively horizontally movable along at least a portion of the suspension arm;

a hoist attachment positioner configured to selectively position hoist attachment hook along the suspension arm;

a tire handler level sensor configured to detect an orientation of the tire handler;

a controller, wherein the controller is configured to receive orientation information from the level sensor and to activate the hoist attachment positioner to keep tire handler orientation within a prescribed range;

a neck member connected to the rear end of the suspension arm;

an upper arm articulation member;

a plurality of arm articulation member engagement holes defined in the neck;

a neck engagement pin connected to the arm articulation member, wherein the neck engagement pin is configured to selectively connect the arm articulation member to the neck by placement through a hub engagement hole or withdrawal from an arm articulation member engagement hole;

a remotely-controlled actuator connected to the neck engagement pin and configured to control the placement and withdrawal of the neck engagement pin and a neck engagement indicator configured to indicate to a user when the neck engagement pin is safely positioned through a hub engagement hole;

a left arm extending generally-downward from the left arm hinge of the arm articulation member, the left arm comprising an upper left arm, a left arm articulation member adjustably connected to the upper left arm, a lower left arm hingedly connected to the left arm articulation member, the lower left arm comprises forward lower left arm beam, rear lower left arm beam, and lower left arm positioner; the lower left arm positioner comprises a linear actuator and is connected between a location near an upper end of rear lower left arm beam and a location near a lower end of forward lower left arm beam;

a right arm extending generally-downward from the right arm hinge of the arm articulation member, the right arm comprising an upper right arm, a right arm articulation member adjustably connected to the upper right arm, a lower right arm hingedly connected to the right arm articulation member; the lower right arm comprises forward lower right arm beam, rear lower right arm beam, and lower right arm positioner; and the lower right arm positioner comprises a linear actuator and is connected between a location near an upper end of rear lower right arm beam and a location near a lower end of forward lower right arm beam;

a generally-planar platform connected at a left end to the lower left arm and connected at a right end to the lower right arm, wherein the platform is configured to have a selectively adjustable width; an equipment compartment defined beneath the platform and accessible by moving a part of the platform and wherein the platform comprises an upper surface with sufficient rigidity to securely support a human user standing on the upper surface and the upper surface comprises a non-slip surface;

a left tire support roller extending from a forward left side of the platform and a right tire support roller extending from a forward right side of the platform;

a left roller motor connected to the left tire support roller and a right roller motor connected to the right tire support roller, wherein the left roller motor and the right roller motor are rotary actuators configured to power rotational movement of a tire;

a left tire grab arm extending from a location on the tire handler near the connection of the left arm and the platform, the left tire positioning arm comprising an inside left tire grab arm configured to restrict rearward movement of a tire, an outside left tire gram arm configured to restrict lateral movement of a tire, and a front left tire grab arm configured to restrict forward movement of a tire; wherein the left tire grab arm is configured to be readily moved to a non-use location away from a supported tire to provide additional clearance when necessary;

a right tire positioning arm extending from a location on the tire handler near the connection of the right arm and the platform, the right tire positioning arm comprising an inside right tire grab arm configured to restrict rearward movement of a tire, an outside right tire grab arm configured to restrict lateral movement of a tire, and a front right tire grab arm configured to restrict forward movement of a tire, wherein the right tire grab arm are configured, independently, to be readily moved to a non-use location away from a supported tire to provide additional clearance when necessary remotely-controllable powered means for repositioning each of the inside left tire grab arm, outside left tire grab arm, front left tire gram arm, inside right tire grab arm, outside right tire grab arm, front right tire grab arm with respect to a tire on the tire handler;

a battery;

a battery charger, configured to charge the battery when connected to an external power source;

a hydraulic power unit configured to be powered using energy from the battery, wherein the battery and the hydraulic power unit are configured to be capable of powering all powered components of the tire handler for a predetermined length of time;

a wireless receiver electronically connected to the controller; and a wireless remote control configured to communicate with the wireless receiver and allow a user to control all powered components of the tire handler from a safe location.

BRIEF DESCRIPTION OF THE DRAWINGS

The disclosed inventions will be described with reference to the accompanying drawings, which show important sample embodiments, wherein:

FIG. 7 is an enlarged front view of a bottom portion of a tire handler.

FIG. 8 is an detailed front view of a grab arm of a tire handler.

FIG. 9 is a detailed front view of a tire support arm for a tire handler.

FIG. 10 is a side view of a tire handler in a compact configuration.

FIG. 11 is a front view of a tire handler in a compact configuration.

DETAILED DESCRIPTION OF THE PREFERRED EMBODIMENTS

Figure 1:
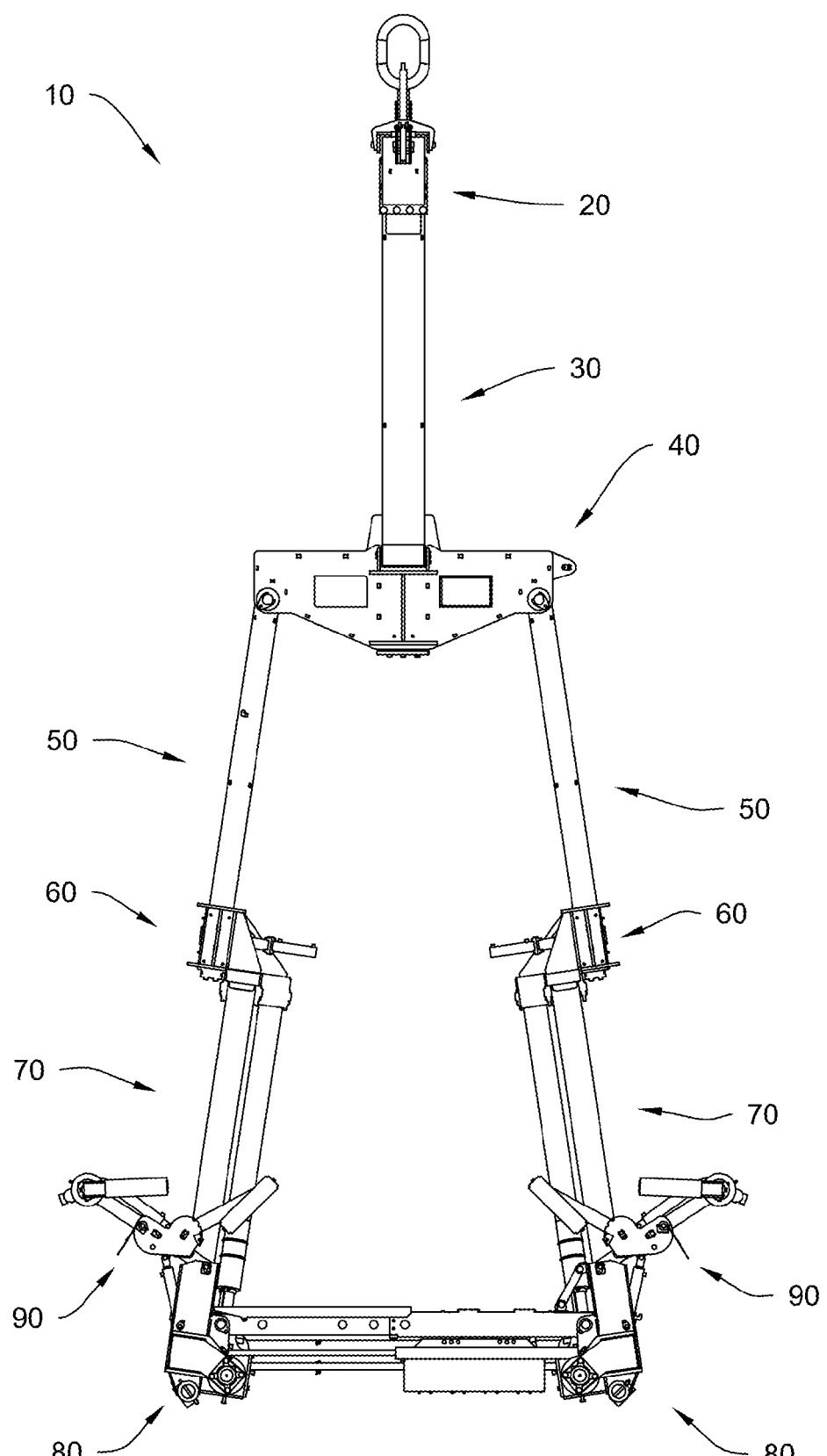
FIG. 1 is a perspective view of a tire handler.

FIG. 1 illustrates a tire handler 10 embodying features of the inventions disclosed herein. Tire handler 10 generally comprises suspension arm 20, neck 30, upper arm articulation member 40, upper arms 50, lower arm articulation members 60, lower arms 70, and tire engagement assembly 80. Suspension arm 20 is positioned at the top of tire handler 10. Neck 30 extends downwardly from suspension arm 20. Upper arm articulation member 40 is preferably adjustably connected to neck 30. Upper arms 50 extend generally downwardly from upper arm articulation member 40 and lower arm articulation members 60 are connected to upper arms 50. Lower arms 70 extend from lower arm articulation members 60, and tire engagement assembly 80 is connected to lower arms 70. Each of these general components are discussed in additional detail below in connection with FIGS. 4-8.

Figure 4A:
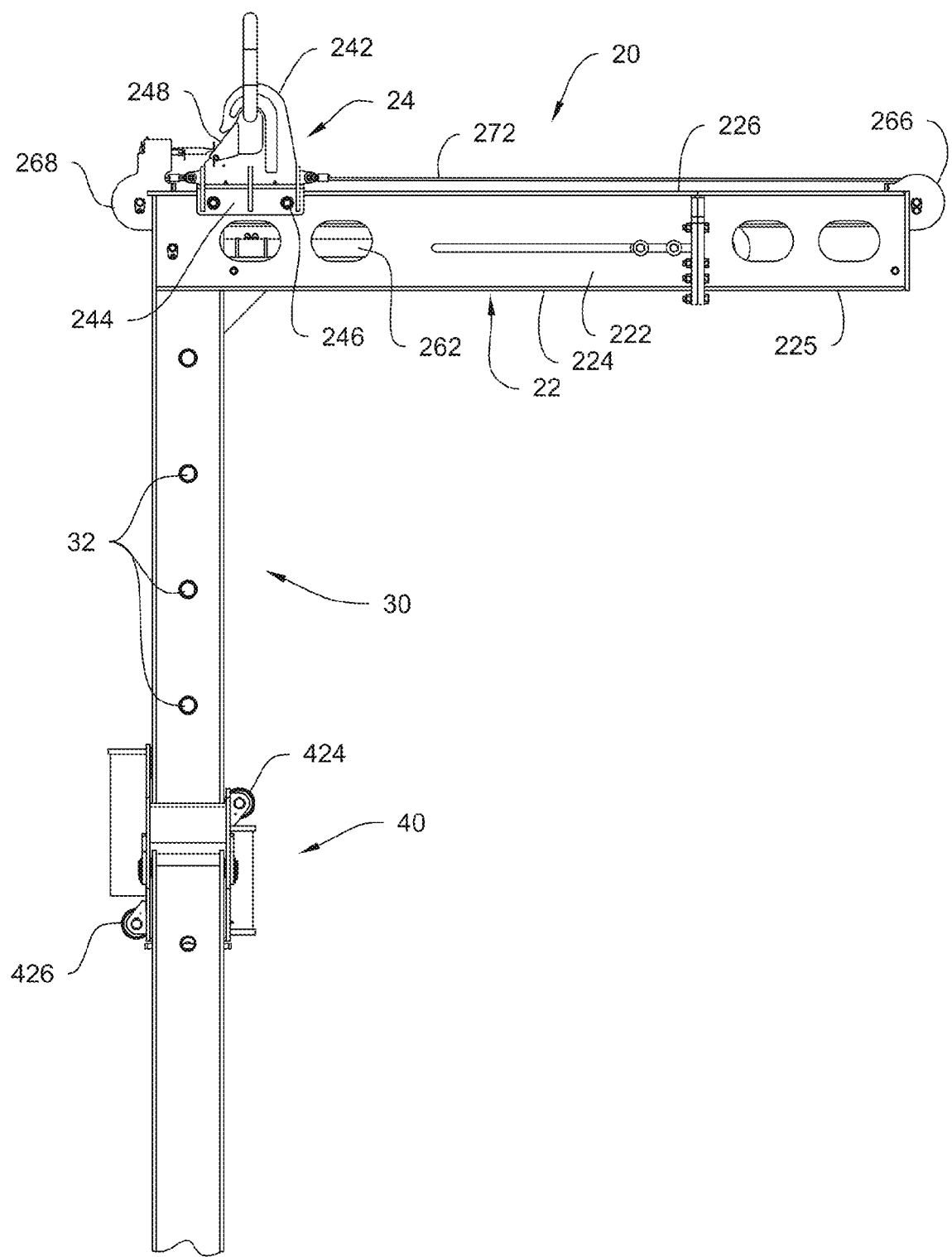
FIG. 4A is an enlarged side view of an upper portion of a tire handler.

Suspension arm 20 is seen in more detail in FIG. 4. Suspension arm 20 preferably provides appropriate attachment point(s) to allow tire handler 10 to be lifted by hoisting equipment (not shown) such as a mobile crane, overhead crane, boom lift, or similar equipment (collectively herein "hoist"). Suspension arm 20 comprises arm body 22, hook assembly 24, forward pulley 26, and rear pulley 28. Arm body 22 is preferably generally-rectangular, comprising two parallel, spaced-apart side walls 222 surrounded by a wider rim 224. An upper surface of rim 224 preferably comprises a planar lift track 226, configured to be slidably engaged by hook assembly 24. A forward suspension segment 225 is configured to be detachable from the rest of suspension arm 20 to reduce overall size of tire handler 10 for transport or storage.

Hook assembly 24 comprises hook 242 attached to lift trolley 244 with wheels 246 configured to engage lift track 226. Hook 242 can comprise a hook, loop, hole, latch, or other device (collectively "hook") that allows tire handler 10 to be securely lifted by a hoist. Hook assembly 24 also preferably comprises selectively closable hook latch 248, which most preferably can be operated remotely. Hook assembly 24 is selectively movable along lift track 226 so that hook 242 can be moved in response to changes in the center of gravity. This movement is preferably automated and can be accomplished a leveling system 26.

Figure 4B:
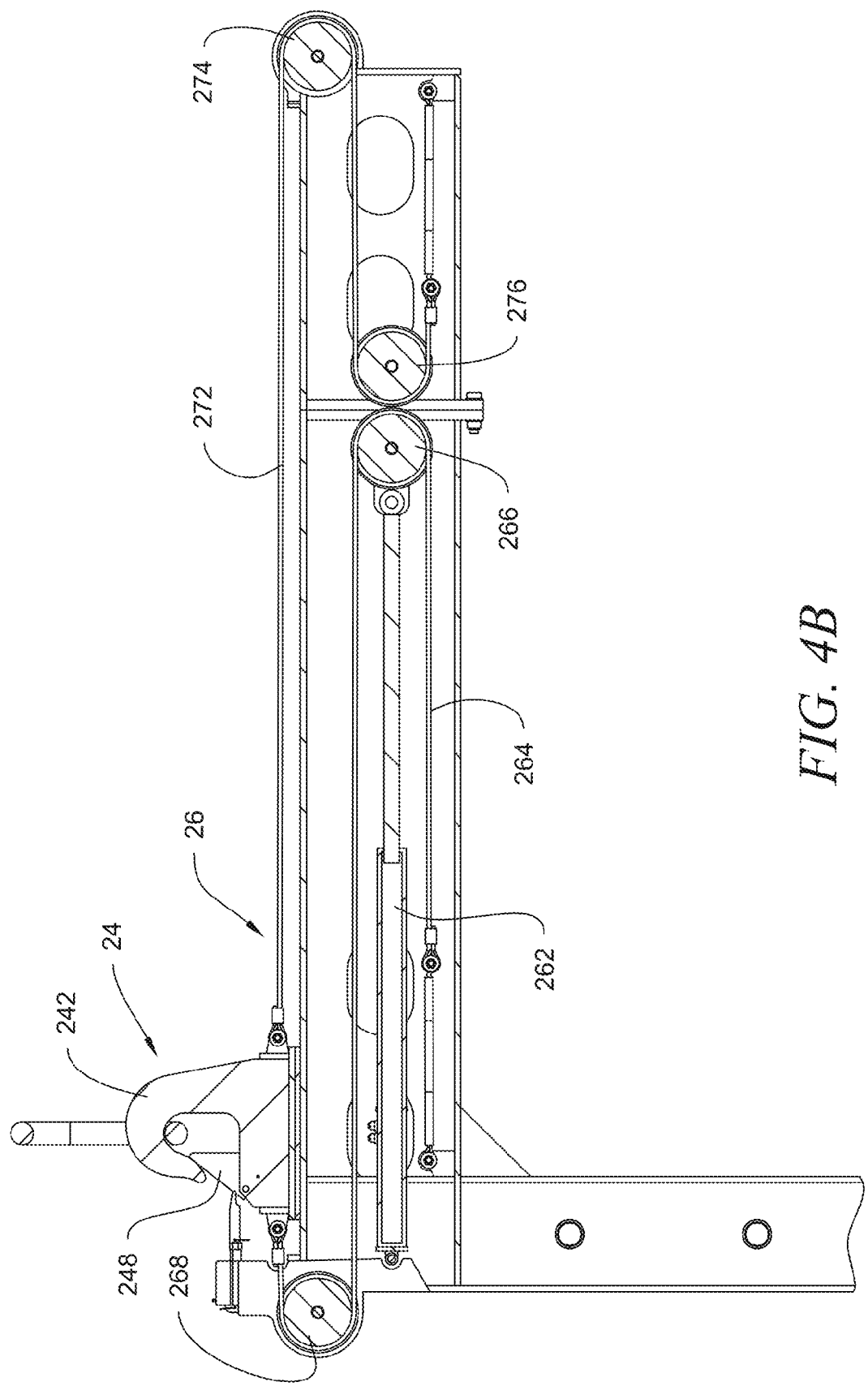
FIG. 4B is an enlarged cross-section side view of an upper portion of a tire handler.

Leveling system 26 is shown in FIG. 4B. Leveling system 26 preferably comprises hydraulic linear actuator 262 acting on a first cable 264 attached to hook assembly 24 via forward pulley 266 and rear pulley 268. Forward pulley 268 is linked to a reverse-motion pulley 276, and a second cable 272 is attached to hook assembly 24 through reverse-motion pulley 276 and a forward suspension segment pulley 274 to allow controlled movement of hook assembly 24 in either direction. Preferably, a controller 856 (FIG. 12) for the hydraulic system receives input from a level sensor 857 and controller 856 initiates appropriate movement of linear actuator 262 to automatically maintain a level position. Most preferably, the controller 856 and level sensor 857 are located in the tire-engagement assembly 80, although other locations can also be used.

Figure 2:
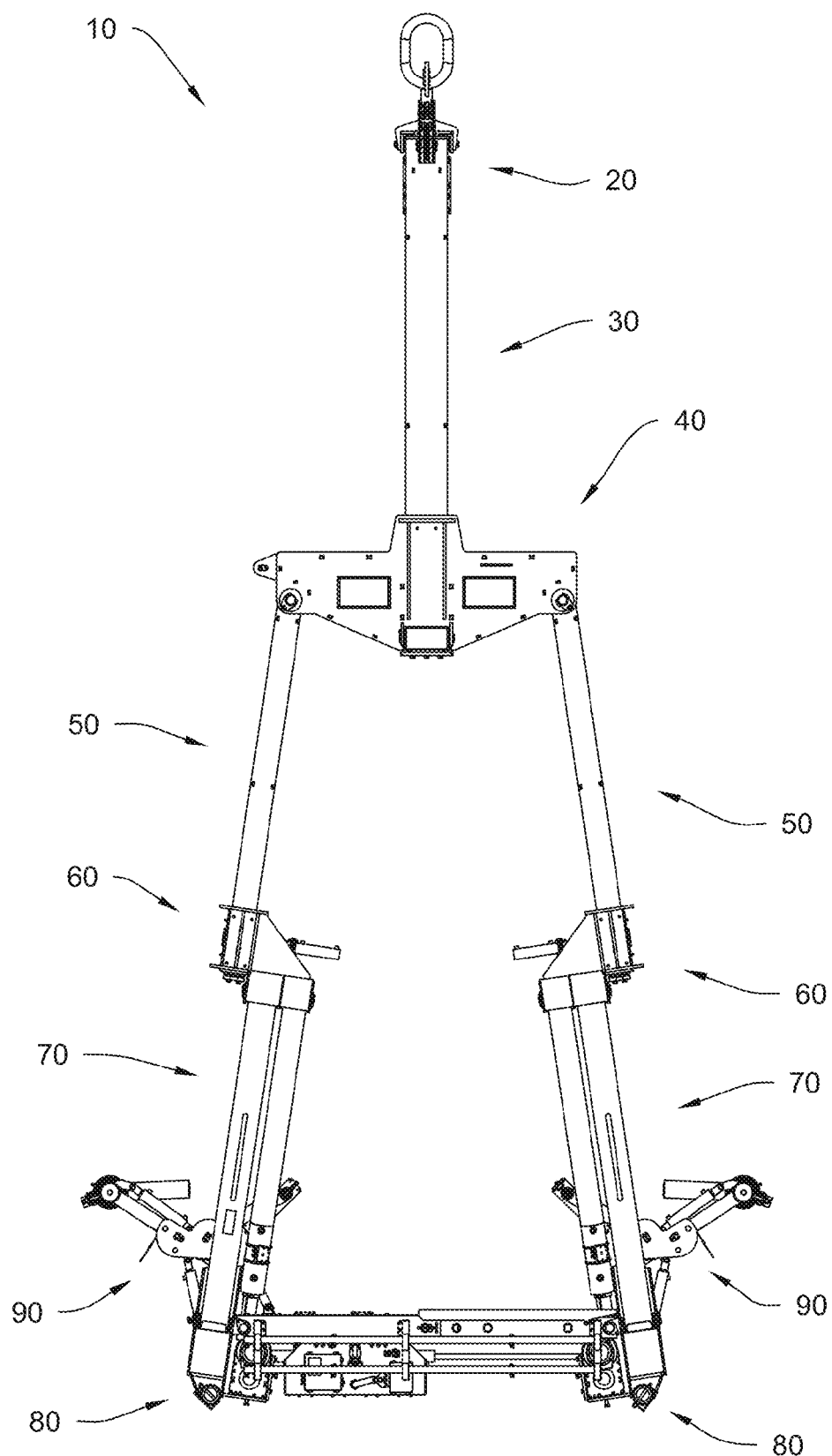
FIG. 2 is a side view of the tire handler of FIG. 1.
Figure 3:
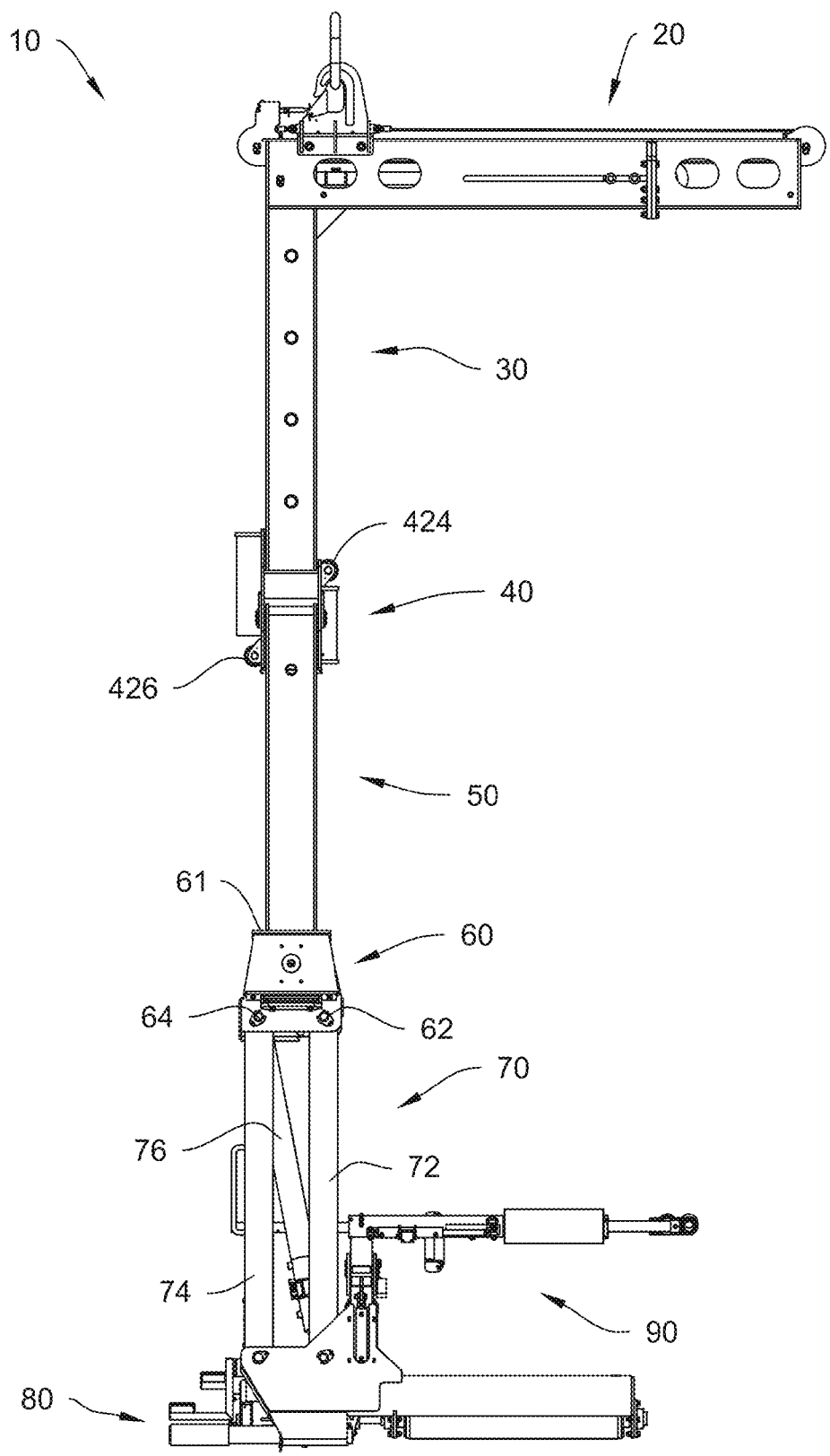
FIG. 3 is a rear view of the tire handler of FIG. 1.

Neck 30 preferably comprises an elongate rectangular beam connected at an upper end to suspension arm 20 by welding, bolting, or other high-strength method. Neck 30 also preferably comprises a plurality of height adjustment holes 32 configured to provide selectable positions for engagement of upper arm articulation member 40 with neck 30. The height adjustment holes 32 shown in FIG. 4 are spaced approximately 12 inches apart. Alternatively, many other means of adjustable connection are known and can be used. FIGS. 1-3 show neck 30 in a fully extended position. FIGS. 9 and 10 show neck 30 in a fully retracted position as can be used for storage.

Figure 5A:
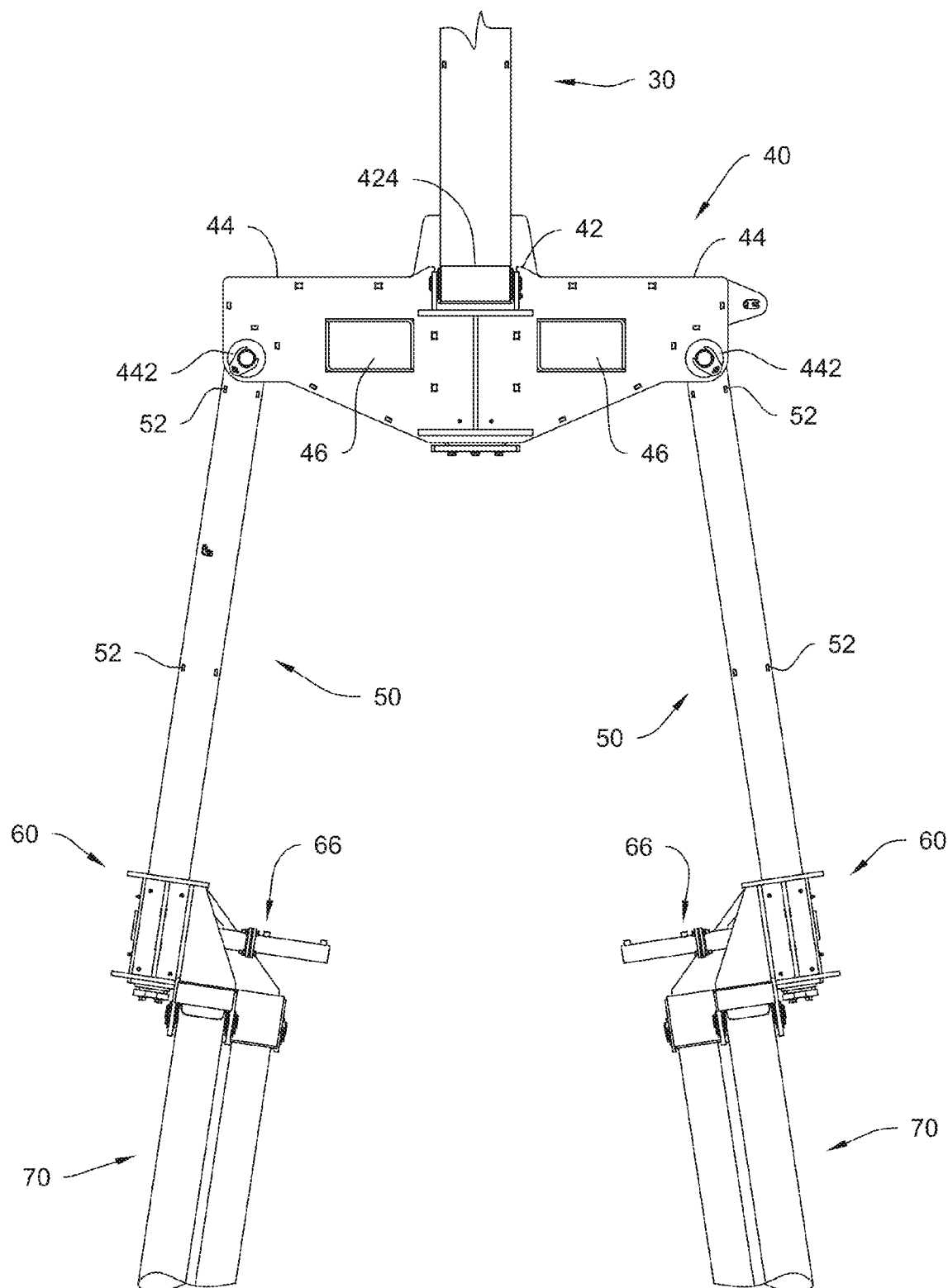
FIG. 5A is an enlarged front view of a middle portion of a tire handler.
Figure 5B:
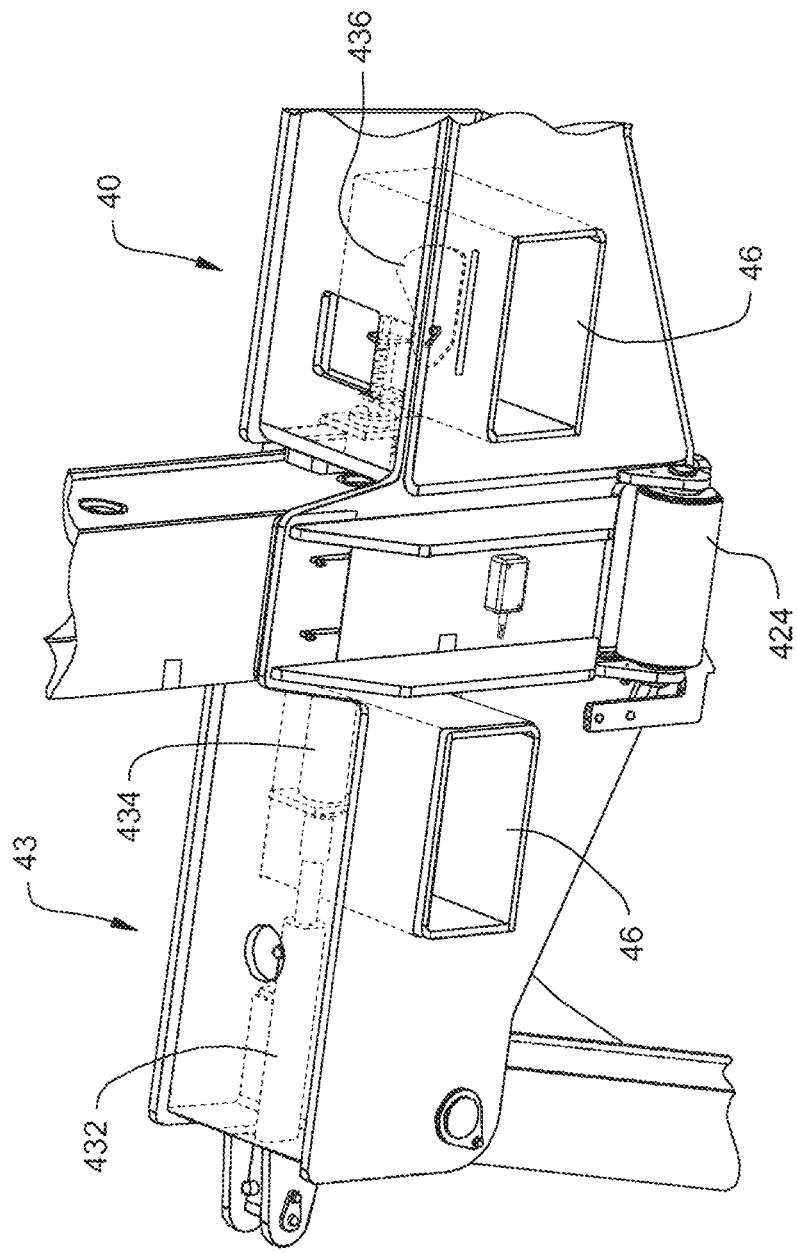
FIG. 5B is an enlarged view of an arm hub for a tire handler, with certain elements hidden for clarity.

Referring to FIG. 5, upper arm articulation member 40 is preferably generally symmetrical and comprises a centrally-defined neck engagement slot 42. Neck engagement slot 42 also preferably comprises forward neck engagement roller 424 and rear neck engagement roller 426. These rollers facilitate movement of upper arm articulation member 40 with respect to neck 30. Upper arm articulation member 40 also preferably comprises a remotely-controlled neck position lock 43. Neck position lock 43 preferably comprises a hydraulic linear actuator 432, configured to locking bolt 434 in a height adjustment hole 32. Neck position lock 43 also preferably comprises a lock indicator flag 436 configured to remain hidden inside upper arm articulation member 40 while locking bolt 434 is not engaged with a height adjustment hole 32 and to pivot into view when locking bolt 434 is safely engaged with a height adjustment hole 32.

Upper arm articulation member 40 also comprises opposed shoulder beams 44 extending laterally to each side of neck engagement slot 42. Each shoulder beam 44 comprises an upper arm hinge 442 configured to support an upper arm 50 while allowing upper arm 50 to pivot through a range of angles with respect to shoulder beam 44. Upper arm articulation member 40 also preferably comprises two or more fork pockets 46 configured to facilitate lifting tire handler 10 by forklift (not shown), especially when in a collapsed position.

Upper arms 50 extend generally downward from upper arm hinge 442. Upper arms 50 preferably comprise rectangular beams. Preferably, lower arm articulation members 60 are adjustably connected to upper arms 50 to allow further compactability when tire handler 10 is not in use, the ability to use tire handler 10 in tighter spaces, and/or additional tire size flexibility. Adjustability can be provided by defining a plurality of upper arm engagement holes 52 in upper arms 20.

Lower arm articulation members 60 comprise an upper arm engagement slot 61, forward lower arm hinge 62, and rear lower arm hinge 64, and upper arm engagement bolts 66. Upper arm engagement bolts 66 are configured to selectively engage upper arm engagement hole 52, preferably by remote hydraulic activation.

Lower arms 70 each comprise forward lower arm beam 72 and rear lower arm beam 74. Forward lower arm beam 72 is connected to forward lower arm hinge 62. Rear lower arm beam 74 is connected to rear lower arm hinge 64. Lower arms 70 also comprise a lower arm positioner 76, which preferably comprises a hydraulic piston connected between a first location near an upper end of rear lower arm beam 74 and a second location near a lower end of forward lower arm beam 72. Lower arm positioner 76 allows controlled movement of lower arms 70 and the attached tire engagement assembly 80. Use of forward lower arm beam 72 and rear lower arm beam 74 that are of substantially equal length and in parallel position is preferred as this arrangement maintains tire engagement assembly 80 at a constant angle with respect to suspension arm 20. The use of lower arms 70 and lower arm positioner 76 to move tire engagement assembly 80 forwardly allows tire handler 10 to work in more locations, such as removal or installation of the inner tire in a dual tire setup (see FIG. 15).

Figure 6:
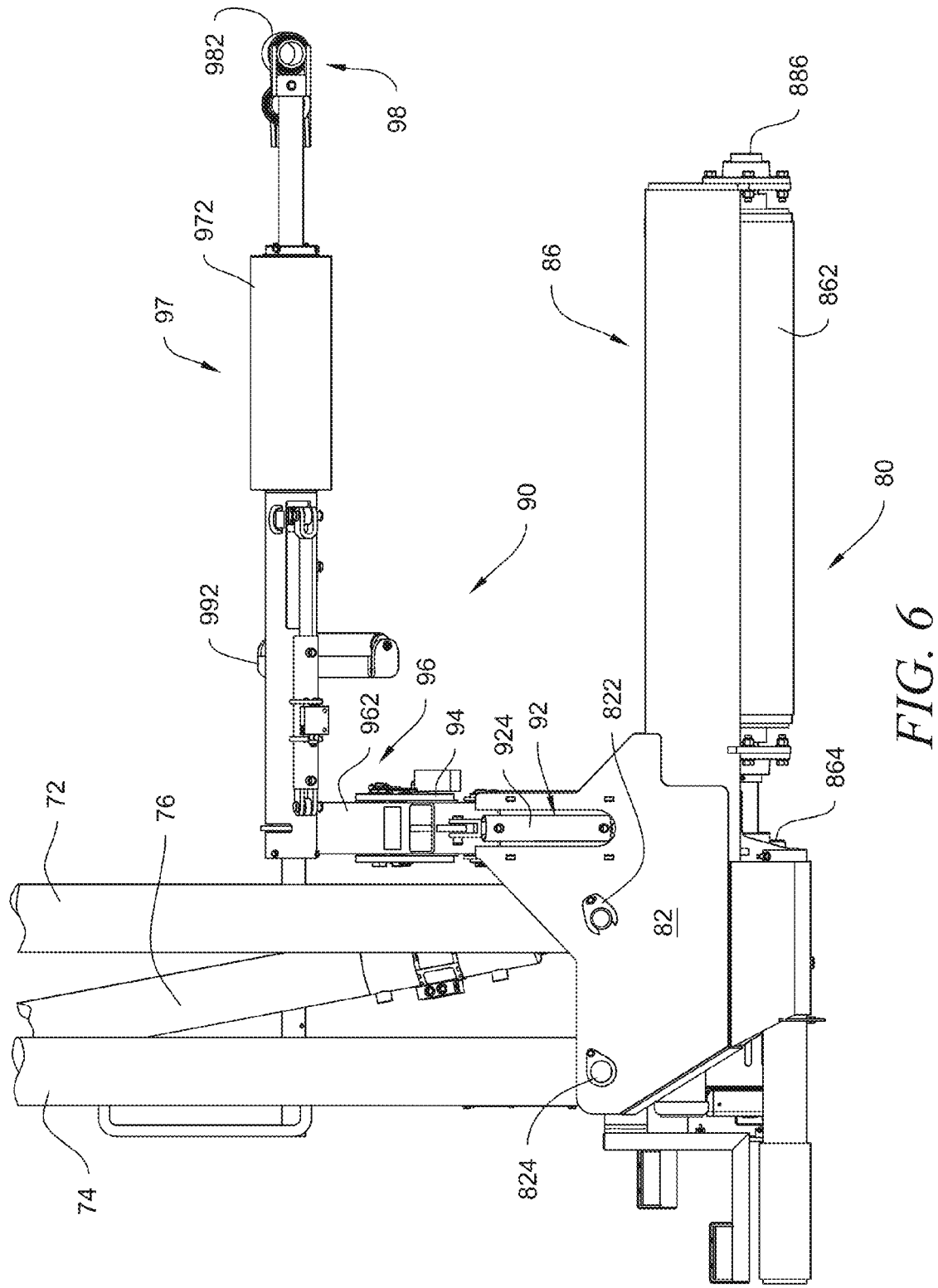
FIG. 6 is an enlarged side view of a bottom portion of a tire handler.

Referring to FIGS. 6 & 7, tire engagement assembly 80 is preferably connected to the lower ends of each lower arm 70 through lower arm attachment shoes 82. Lower arm attachment shoes 82 are located near laterally-opposed ends of assembly platform 84. Attachment shoes 82 comprise forward hinge 822, connected to forward lower arm beam 72, and rear hinge 824, connected to rear lower arm beam 74. Assembly platform 84 extends between lower arm attachment shoes 82. Assembly platform 84 preferably comprises at least two sections that are slidably interconnected to allow adjustment of the width of assembly platform 84. Assembly platform 84 also preferably comprises width adjustment means 842 such as a hydraulic cylinder.

Figure 13:
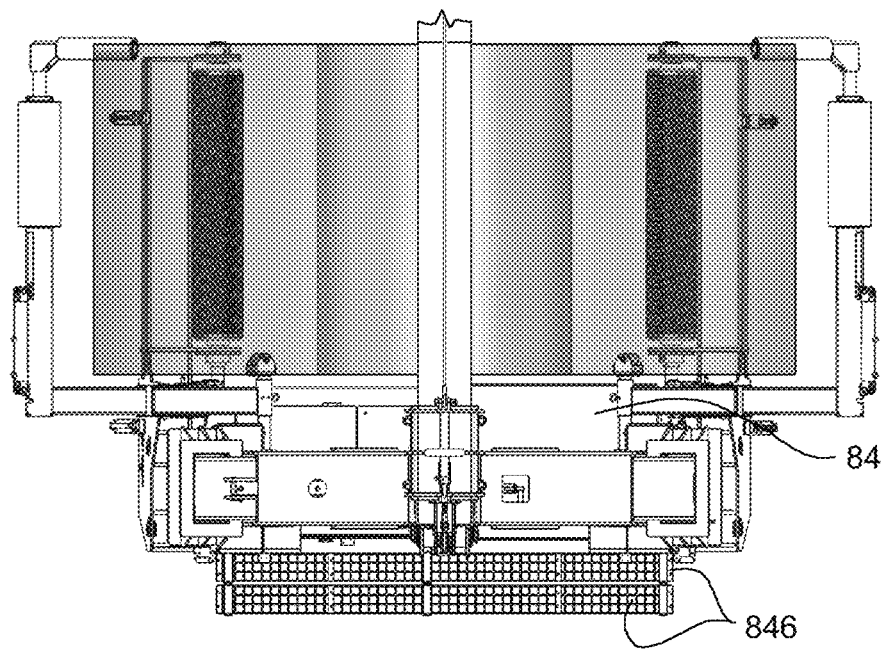
FIG. 13 is a top view of a tire engagement assembly of a tire handler.
Figure 14:
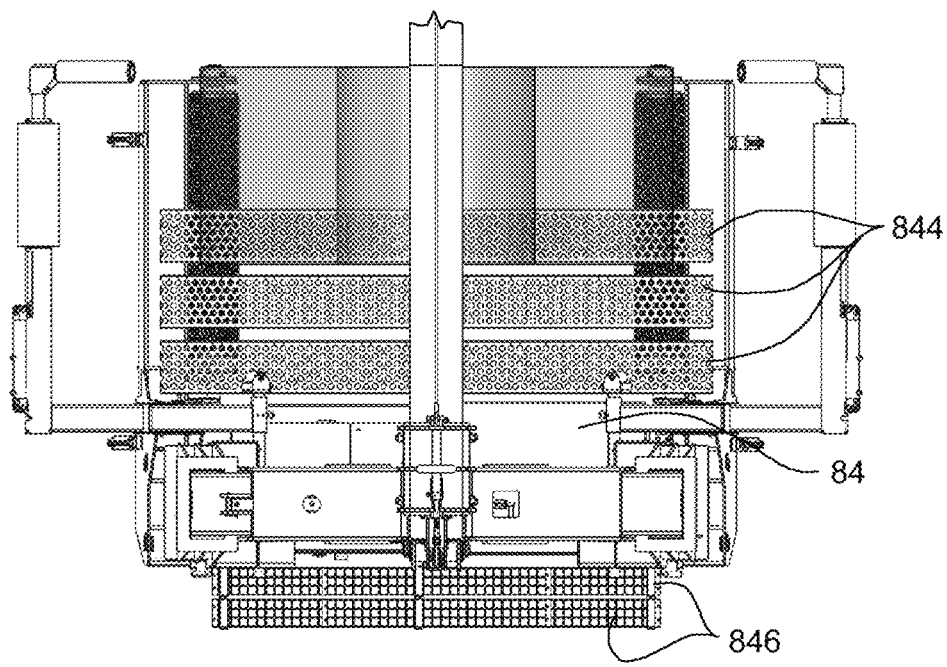
FIG. 14 is a top view of a tire engagement assembly of a tire handler with extension planks.

Assembly platform 84 can also be used as a work surface for users working on a tire. Therefore, assembly platform 84 is preferably configured to safely support the weight of one or more workers and tools. Further, the upper surface of platform 84 comprises a slip-resistant surface to reduce the risk of accidents. Additionally, as shown in FIG. 14, platform 84 can be supplemented with one or more platform extension planks 844. Platform extension planks 844 provide an extended work surface, allowing users to safely reach the tire and/or wheel when a narrower tire is being worked on. Platform extension planks 844 can be removed when necessary to accommodate a wider tire, as shown in FIG. 13. Assembly platform 84 also preferably includes one or more steps 846, allowing easier access by a user.

Figure 12:
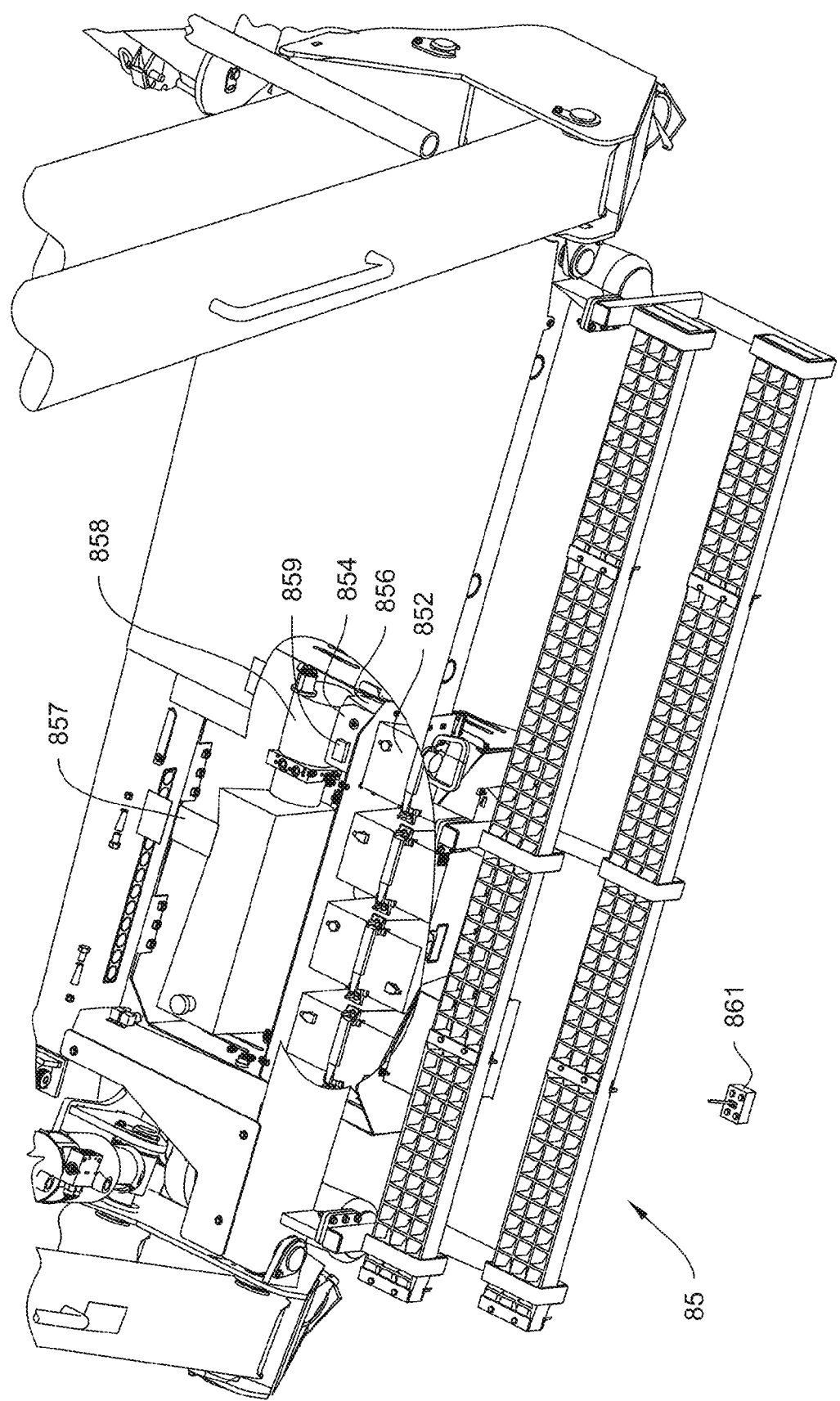
FIG. 12 is a rear perspective view of a bottom portion of a tire handler with an open equipment compartment.

Referring to FIG. 12, tire engagement assembly 80 comprises an equipment compartment 85 defined below assembly platform 84. Equipment compartment 85 preferably houses batteries 852, battery charger 854, controller 856, level sensor 857, hydraulic power unit 858, and can also house other components and accessories. Batteries 852 provide power for all electric motors and for hydraulic power unit 858. Batteries 852 preferably comprise an array sufficient to deliver at least 880 Ah at 24 Vdc and are charged through battery charger 854 using external AC power. At least a portion of assembly platform 84 is removable or hingedly liftable to provide access to equipment compartment 85 for maintenance or repair of equipment housed therein. Although on-board electric power through a battery array is contemplated as a convenient power system, many other sources of on-board or external power are known and can be used, such as AC electric, hydraulic, or pneumatic power.

Tire engagement assembly 80 also comprises tire support arms 86, which extend forwardly from lower arm attachment shoes 82. Tire support arms 86 comprise tire rollers 862 extending along an inside surface of tire support arms 86. Rollers 862 are powered by roller motors 864 beneath assembly platform 84. Roller motors 864 are preferably electric motors.

Tire engagement assembly 80 also comprises grab arms 90. Grab arms 90 comprise multiple independently-adjustable arm segments to provide for secure holding of a wide variety of tire sizes. Most of the adjustability is accomplished using powered and remotely-controlled mechanisms, since the arm segments can be heavy and/or difficult to reach. A hub support segment 92 extends generally upwardly from attachment shoe 82 to grab arm hub 94. Hub support segment 92 comprises hub support post 922 and hub positioner 924. Hub positioner 924 preferably comprises a hydraulic linear actuator and is configured to change the location and orientation of grab arm hub 94 to accommodate differing tire sizes and to aid in moving to a storage mode.

An outside intermediate arm segment 96 is connected at a lower end to grab arm hub 94 and at an upper end to outside arm segment 96. Outside intermediate arm segment 96 preferably comprises outside intermediate arm support post 962 and outside intermediate arm positioner 964. Outside intermediate arm positioner 964 preferably comprises a hydraulic linear actuator configured to adjust the position of outside intermediate arm segment 96 with respect to grab arm hub 94.

An outside arm segment 97 extends forwardly from an upper end of outside intermediate arm segment 96. Outside arm segment 97 comprises outside roller 972, which can be moved by a user by changing the position of outside intermediate arm segment 96 to engage the tire when desired. When engaged with a tire, outside roller 972 restricts lateral movement while allowing rotational movement. A outside arm segment 97 also comprises telescoping extension 974. Telescoping extension 974 is concentric with outside roller 972 and extends forwardly of outside roller 972. The amount of extension of telescoping extension 974, as well as the angle of orientation of telescoping extension 974, are preferably controllable using hydraulic activators (not shown).

At a forward end of outside arm segment 97, a forward arm segment 98 extends inwardly. Forward arm segment 98 comprises forward roller 982, which can be positioned by a user to restrict the tire from falling forward while allowing rotational movement of the tire. Movement of forward arm segment 98 is accomplished by controlling the extension and angle of telescoping extension 974.

An inside arm segment 99 extends inwardly from grab arm hub 94. Inside arm segment comprises rear roller 992 at an inward end. Rear roller 992 can be positioned by a user to restrict the tire from falling backward while allowing rotational movement.

In a preferred embodiment, all movements of powered components of tire handler 10, such as hook latch 248, neck position lock 43, upper arm engagement bolts 66, lower arm positioner 76, width adjustment means 842, roller motors 864, hub positioner 924, outside intermediate arm positioner 964, telescoping extension 974 are controlled using a wireless remote control unit 861 which communicates with a wireless receiver 859 connected to controller 856. This allows a user to move and manipulate tire handler 10 and a tire while standing a safe distance away from tire handler 10. Certain fine adjustments, such as final alignment of wheel lugs, may need to be made by a user standing on or near tire handler 10. For these situations, a secondary remote with a dead man switch is preferably used. The dead man switch prevents any powered movement of tire handler 10 unless the dead man switch is activated.

FIGS. 9 and 10 shows tire handler 10 in a collapsed configuration for transportation or storage. In this configuration neck 30 is fully withdrawn through neck engagement slot 42 and upper arms 50 are withdrawn through lower arm articulation members 60. Assembly platform 84 is moved to its narrowest position and grab arms 90 are moved to an inward position. Additionally, forward suspension segment 225 has been removed.

Figure 15:
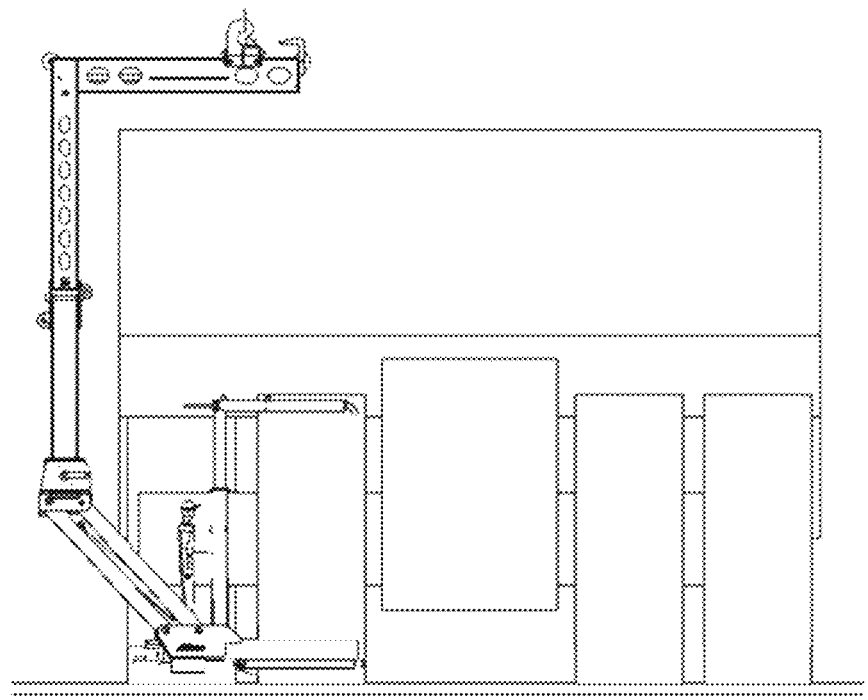
FIG. 15 is a side view of a tire handler working on an outer wheel of a large vehicle.
Figure 16:
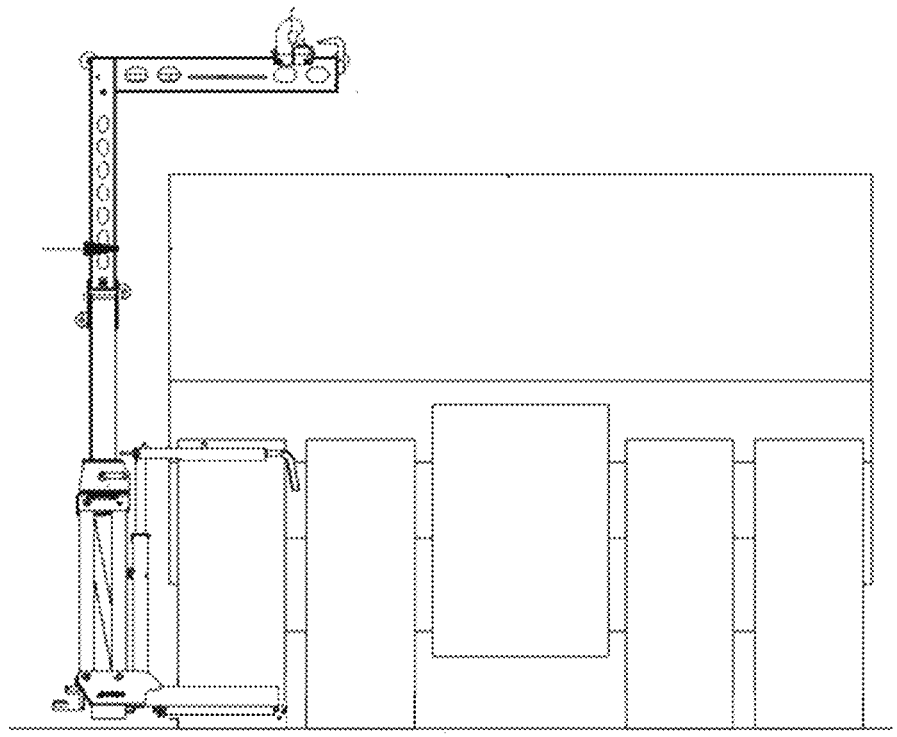
FIG. 16 is a side view of a tire handler working on an inner wheel of a large vehicle.

FIGS. 15 and 16 show a tire handler 10 in use for a large vehicle and provides a example scale reference. FIG. 15 shows use of tire handler on an outer wheel of a dual wheeled vehicle while FIG. 16 shows use on an inner wheel of the same vehicle. The illustrated embodiment is sized for use with large moving equipment such as a Caterpillar 797F, with tire diameters between 9 and 13 feet. In this embodiment, the overall height of the fully expanded tire handler is about 32 feet and the length of suspension arm 20 is about 15 feet. The materials, fasteners, welds, bearings and other features are sized to hold tire/wheel combinations weighing up to 20,000 lbs., resulting in a device weight of about 12,500 lbs.

Those of ordinary skill in the art will understand that tire handler 10 can be made with different dimensions to accommodate other sizes and shapes of tires. Further, not all described components and features will be necessary or desired for all uses. By way of examples: where compact storage is not required, tire handler 10 can omit adjustable neck connection and adjustable lower arm articulation connections; where only easily accessible wheels will be serviced, movable lower arms may not be necessary; and for some tire sizes and weights, tire engagement assembly might be supportable using a single arm rather than right and left arms.

Although the invention has been described with reference to specific embodiments, this description is not meant to be construed in a limiting sense. Various modifications of the disclosed embodiments, as well as alternative embodiments of the inventions, will be apparent to persons skilled in the art upon reference to the description of the invention. It is, therefore, contemplated that the appended claims will cover such modifications that fall within the scope of the invention.

The invention claimed is:

1. A tire handler for movement and manipulation of tires and wheels for large vehicles comprising:
   a suspension arm with a front end and a rear end;
   a hoist attachment hook connected to the suspension arm and selectively horizontally movable along at least a portion of the suspension arm;
   an arm articulation member connected to the suspension arm near the rear end of the suspension arm, wherein the arm articulation member comprises a left arm hinge and a right arm hinge;
   a left arm extending generally-downward from the left arm hinge of the arm articulation member and a right arm extending generally-downward from the right arm hinge of the arm articulation member;
   a generally-planar platform connected at a left end to left arm and connected at a right end to the right arm, wherein the platform is configured to have a selectively adjustable width;
   a left tire support roller extending from a forward left side of the platform and a right tire support roller extending from a forward right side of the platform, wherein at least one of the left tire support roller or the right tire support roller is configured to be turned by a user to cause rotational movement of a tire.

2. The tire handler of claim 1 further comprising a left roller motor connected to the left tire support roller and a right roller motor connected to the right tire support roller, and wherein the left roller motor and the right roller motor are configured to power rotational movement of a tire at the control of a user.

3. The tire handler of claim 2 wherein the left roller motor and the right motor roller comprise rotary actuators.

4. The tire handler of claim 3 further comprising:
a battery;
a battery charger, configured to charge the battery when connected to an external power source; and
a hydraulic power unit configured to be powered using energy from the battery, wherein the battery and the hydraulic power unit are configured to be capable of powering all powered components of the tire handler for a predetermined length of time.

5. The tire handler of claim 1 further comprising a hoist attachment positioner configured to selectively position hoist attachment hook along the suspension arm.

6. The tire handler of claim 5 further comprising: a tire handler level sensor configured to detect an orientation of the tire handler; and a controller, wherein the controller is configured to receive orientation information from the level sensor and to activate the hoist attachment positioner to keep tire handler orientation within a prescribed range.

7. The tire handler of claim 1 further comprising a neck member connected between the rear end of the suspension arm and the arm articulation member, and wherein the vertical distance between the suspension arm and the arm articulation member can be adjusted by relative movement between the neck and the arm articulation member.

8. The tire handler of claim 7 further comprising:
a plurality of arm articulation member engagement holes defined in the neck; and
a neck engagement pin connected to the arm articulation member, wherein the neck engagement pin is configured to selectively connect the arm articulation member to the neck by placement through a hub engagement hole or withdrawal from an arm articulation member engagement hole.

9. The tire handler of claim 8 further comprising a remotely-controlled actuator connected to the neck engagement pin and configured to control the placement and withdrawal of the neck engagement pin.

10. The tire handler of claim 8 further comprising a neck engagement indicator configured to indicate to a user when the neck engagement pin is safely positioned through a hub engagement hole.

11. The tire handler of claim 1 wherein:
the left arm further comprises an upper left arm, a left arm articulation member adjustably connected to the upper left arm, a lower left arm hingedly connected to the left arm articulation member; and
the right arm further comprises an upper right arm, a right arm articulation member adjustably connected to the upper right arm, a lower right arm hingedly connected to the right arm articulation member.

12. The tire handler of claim 11 wherein: the lower left arm comprises forward lower left arm beam, rear lower left arm beam, and lower left arm positioner;
the lower left arm positioner comprises a linear actuator and is connected between a location near an upper end of rear lower left arm beam and a location near a lower end of forward lower left arm beam;
the lower right arm comprises forward lower right arm beam, rear lower right arm beam, and lower right arm positioner; and
the lower right arm positioner comprises a linear actuator and is connected between a location near an upper end of rear lower right arm beam and a location near a lower end of forward lower right arm beam.

13. The tire handler of claim 1 further comprising an equipment compartment defined beneath the platform and accessible by moving a part of the platform.

14. The tire handler of claim 1 wherein the platform comprises an upper surface with sufficient rigidity to securely support a human user standing on the upper surface and wherein the upper surface comprises a non-slip surface.

15. The tire handler of claim 1 further comprising:
a left tire grab arm extending from a location on the tire handler near the connection of the left arm and the platform, the left tire positioning arm comprising an inside left tire grab arm configured to restrict rearward movement of a tire, an outside left tire grab arm configured to restrict lateral movement of a tire, and a front left tire grab arm configured to restrict forward movement of a tire; and
a right tire positioning arm extending from a location on the tire handler near the connection of the right arm and the platform, the right tire positioning arm comprising an inside right tire grab arm configured to restrict rearward movement of a tire, an outside right tire grab arm configured to restrict lateral movement of a tire, and a front right tire grab arm configured to restrict forward movement of a tire.

16. The tire handler of claim 15 further comprising means for repositioning one or more of the inside left tire grab arm, outside left tire grab arm, front left tire grab arm, inside right tire grab arm, outside right tire grab arm, front right tire grab arm with respect to a tire on the tire handler.

17. The tire handler of claim 15 further comprising means for repositioning each of the inside left tire grab arm, outside left tire grab arm, front left tire grab arm, inside right tire grab arm, outside right tire grab arm, front right tire grab arm with respect to a tire on the tire handler.

18. The tire handler of claim 15 wherein each of the left tire grab arm and the right tire grab arm are configured, independently, to be readily moved to a non-use location away from a supported tire to provide additional clearance when necessary.

19. A tire handler for movement and manipulation of tires and wheels for large vehicles comprising:
a suspension arm with a front end and a rear end;
a hoist attachment hook connected to the suspension arm and selectively horizontally movable along at least a portion of the suspension arm;
a hoist attachment positioner configured to selectively position hoist attachment hook along the suspension arm;
a tire handler level sensor configured to detect an orientation of the tire handler;
a controller, wherein the controller is configured to receive orientation information from the level sensor and to activate the hoist attachment positioner to keep tire handler orientation within a prescribed range;
a neck member connected to the rear end of the suspension arm; an upper arm articulation member;
a plurality of arm articulation member engagement holes defined in the neck;
a neck engagement pin connected to the arm articulation member, wherein the neck engagement pin is configured to selectively connect the arm articulation member to the neck by placement through a hub engagement hole or withdrawal from an arm articulation member engagement hole;
a remotely-controlled actuator connected to the neck engagement pin and configured to control the placement and withdrawal of the neck engagement pin and
a neck engagement indicator configured to indicate to a user when the neck engagement pin is safely positioned through a hub engagement hole;

a left arm extending generally-downward from the left arm hinge of the arm articulation member, the left arm comprising an upper left arm, a left arm articulation member adjustably connected to the upper left arm, a lower left arm hingedly connected to the left arm articulation member, the lower left arm comprises forward lower left arm beam, rear lower left arm beam, and lower left arm positioner; the lower left arm positioner comprises a linear actuator and is connected between a location near an upper end of rear lower left arm beam and a location near a lower end of forward lower left arm beam;

a right arm extending generally-downward from the right arm hinge of the arm articulation member, the right arm comprising an upper right arm, a right arm articulation member adjustably connected to the upper right arm, a lower right arm hingedly connected to the right arm articulation member; the lower right arm comprises forward lower right arm beam, rear lower right arm beam, and lower right arm positioner; and the lower right arm positioner comprises a linear actuator and is connected between a location near an upper end of rear lower right arm beam and a location near a lower end of forward lower right arm beam;

a generally-planar platform connected at a left end to the lower left arm and connected at a right end to the lower right arm, wherein the platform is configured to have a selectively adjustable width; an equipment compartment defined beneath the platform and accessible by moving a part of the platform and wherein the platform comprises an upper surface with sufficient rigidity to securely support a human user standing on the upper surface and the upper surface comprises a non-slip surface;

a left tire support roller extending from a forward left side of the platform and a right tire support roller extending from a forward right side of the platform;

a left roller motor connected to the left tire support roller and a right roller motor connected to the right tire support roller, wherein the left roller motor and the right roller motor are rotary actuators configured to power rotational movement of a tire;

a left tire grab arm extending from a location on the tire handler near the connection of the left arm and the platform, the left tire positioning arm comprising an inside left tire grab arm configured to restrict rearward movement of a tire, an outside left tire grab arm configured to restrict lateral movement of a tire, and a front left tire grab arm configured to restrict forward movement of a tire; wherein the left tire grab arm is configured to be readily moved to a non-use location away from a supported tire to provide additional clearance when necessary;

a right tire positioning arm extending from a location on the tire handler near the connection of the right arm and the platform, the right tire positioning arm comprising an inside right tire grab arm configured to restrict rearward movement of a tire, an outside right tire grab arm configured to restrict lateral movement of a tire, and a front right tire grab arm configured to restrict forward movement of a tire, wherein the right tire grab arm are configured, independently, to be readily moved to a non-use location away from a supported tire to provide additional clearance when necessary means for repositioning each of the inside left tire grab arm, outside left tire grab arm, front left tire grab arm, inside right tire grab arm, outside right tire grab arm, front right tire grab arm with respect to a tire on the tire handler;

a battery;

a battery charger, configured to charge the battery when connected to an external power source;

a hydraulic power unit configured to be powered using energy from the battery, wherein the battery and the hydraulic power unit are configured to be capable of powering all powered components of the tire handler for a predetermined length of time;

a wireless receiver electronically connected to the controller; and a wireless remote control configured to communicate with the wireless receiver and allow a user to control all powered components of the tire handler from a safe location.

* * * * *